United States Patent
Yamashita et al.

(10) Patent No.: US 9,609,094 B2
(45) Date of Patent: Mar. 28, 2017

(54) MOBILE DEVICE

(71) Applicant: Sharp Kabushiki Kaisha, Osaka-shi, Osaka (JP)

(72) Inventors: Tetsuya Yamashita, Osaka (JP); Kohichi Murota, Osaka (JP); Keijiroh Higashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/783,543

(22) PCT Filed: Apr. 15, 2014

(86) PCT No.: PCT/JP2014/060670
§ 371 (c)(1),
(2) Date: Oct. 9, 2015

(87) PCT Pub. No.: WO2014/175111
PCT Pub. Date: Oct. 30, 2014

(65) Prior Publication Data
US 2016/0036947 A1    Feb. 4, 2016

(30) Foreign Application Priority Data
Apr. 25, 2013   (JP) ................................. 2013-092503

(51) Int. Cl.
*H04M 1/02* (2006.01)
*H01Q 1/40* (2006.01)
(Continued)

(52) U.S. Cl.
CPC ............ *H04M 1/0202* (2013.01); *H01Q 1/40* (2013.01); *H01Q 9/42* (2013.01); *H01Q 1/243* (2013.01); *H01Q 1/38* (2013.01)

(58) Field of Classification Search
CPC ........ H01Q 1/243; H01Q 1/242; H01Q 1/244; H01Q 1/084; H04B 1/3833; H04M 1/0214; H04M 1/23; H04M 1/0247; H04M 1/0237
(Continued)

(56) References Cited

U.S. PATENT DOCUMENTS

2004/0023701 A1\* 2/2004 Hankui ................. H01Q 1/244
                                                                455/575.7
2004/0036656 A1    2/2004 Nevermann
(Continued)

FOREIGN PATENT DOCUMENTS

CN          1471789 A     1/2004
JP       2007-288360 A   11/2007

*Primary Examiner* — Cong Tran
(74) *Attorney, Agent, or Firm* — Keating & Bennett, LLP

(57) ABSTRACT

A mobile phone includes an antenna housing made of a resin, an insert metal plate made of a metal, which is buried in the antenna housing and has a connecting portion exposed from an outer surface of the antenna housing, and an antenna element provided on the outer surface of the antenna housing and brought into contact with the connecting portion. A boundary between a region where the antenna element is in contact with the connecting portion and a region where the antenna element is in contact with the antenna housing is nonlinear. With this structure, a mobile device is provided in which deterioration of the antenna performance is reduced even in the event of being subjected to an excessive external shock.

5 Claims, 7 Drawing Sheets

(51) Int. Cl.
*H01Q 9/42* (2006.01)
*H01Q 1/38* (2006.01)
*H01Q 1/24* (2006.01)

(58) Field of Classification Search
USPC ..... 455/575.1, 575.5, 575.7–8; 343/872, 873
See application file for complete search history.

(56) References Cited

U.S. PATENT DOCUMENTS

| | | | |
|---|---|---|---|
| 2006/0160585 A1* | 7/2006 | Miyagawa | H01Q 1/243 |
| | | | 455/575.7 |
| 2007/0241971 A1 | 10/2007 | Tsujimura et al. | |
| 2007/0247374 A1* | 10/2007 | Nishikido | H01Q 1/243 |
| | | | 343/702 |
| 2009/0295649 A1* | 12/2009 | An | H01Q 1/243 |
| | | | 343/702 |

* cited by examiner

MOBILE DEVICE

TECHNICAL FIELD

This invention generally relates to a mobile device, and more specifically to a mobile device with an antenna on an outer portion of a housing.

BACKGROUND ART

With regard to a conventional mobile device, Japanese Patent Laying-Open No. 2007-288360, for example, discloses a mobile communication terminal aimed at realizing simple and low-cost integration of a housing and an antenna to enable an even greater size reduction in the terminal, and increasing the degree of freedom of shape of the terminal housing (PTD 1). The mobile communication terminal disclosed in PTD 1 has an antenna element made of a conductive metal pattern formed on the surface of an outer cover of the housing.

CITATION LIST

Patent Document

PTD 1: Japanese Patent Laying-Open No. 2007-288360

SUMMARY OF INVENTION

Technical Problem

In recent years, mobile devices such as mobile phones and the like are required to be waterproof. In order to provide a waterproof structure, an antenna may be disposed inside a housing having a waterproof structure. For maximum antenna performance, however, the antenna is preferably disposed outside the housing. When, however, an antenna made of a metal is formed on an outer surface of a housing made of a resin, in the event that a mobile device is subjected to an excessive shock upon being dropped, for example, the resin and the metal have different conformability in response to the shock. This may cause significant deterioration of the antenna performance of the mobile device due to a break in the antenna, for example.

Accordingly, it is an object of this invention to solve the above-described problem, and provide a mobile device in which deterioration of the antenna performance is reduced even in the event of being subjected to an excessive external shock.

Solution to Problem

A mobile device according to this invention includes a housing made of a resin, a conductive member made of a metal, which is buried in the housing and has a connecting portion exposed from an outer surface of the housing, and an antenna element provided on the outer surface of the housing and brought into contact with the connecting portion. A boundary between a first region where the antenna element is in contact with the connecting portion and a second region where the antenna element is in contact with the housing is nonlinear.

In the mobile device having this structure, in the event that the mobile device is subjected to an excessive shock, the antenna element is prevented from being separated at the boundary between the first region where the antenna element is in contact with the connecting portion made of a metal and the second region where the antenna element is in contact with the outer surface of the housing made of a resin. In this way, deterioration of the antenna performance can be reduced.

Advantageous Effects of Invention

As described above, according to this invention, a mobile device can be provided in which deterioration of the antenna performance is reduced even in the event of being subjected to an excessive external shock.

DESCRIPTION OF EMBODIMENTS

Embodiments of this invention will be described with reference to the drawings, in which the same or corresponding elements are labeled with the same numerals.

First Embodiment

Figure 1:
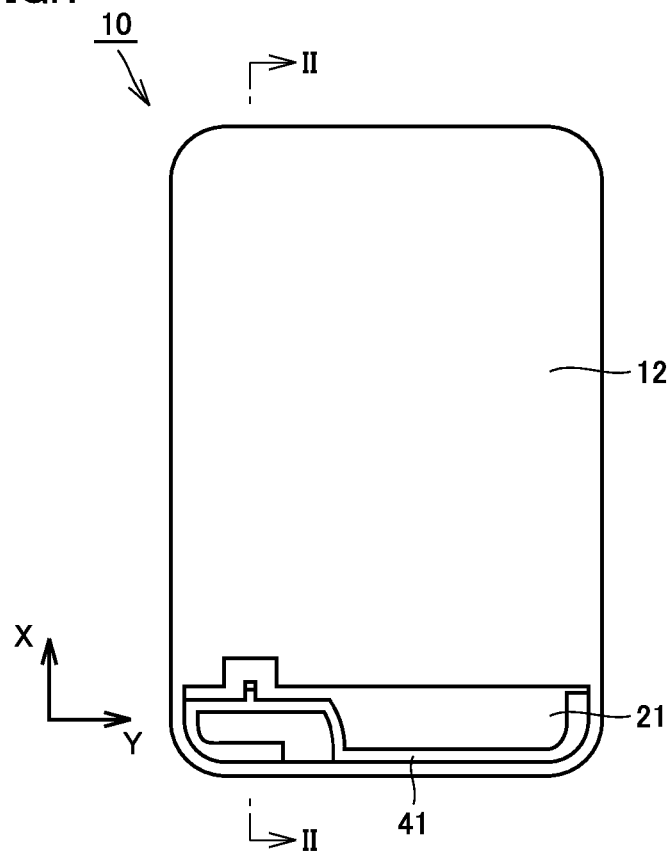
FIG. 1 is a front view showing the appearance of a mobile phone according to a first embodiment of this invention.
Figure 2:
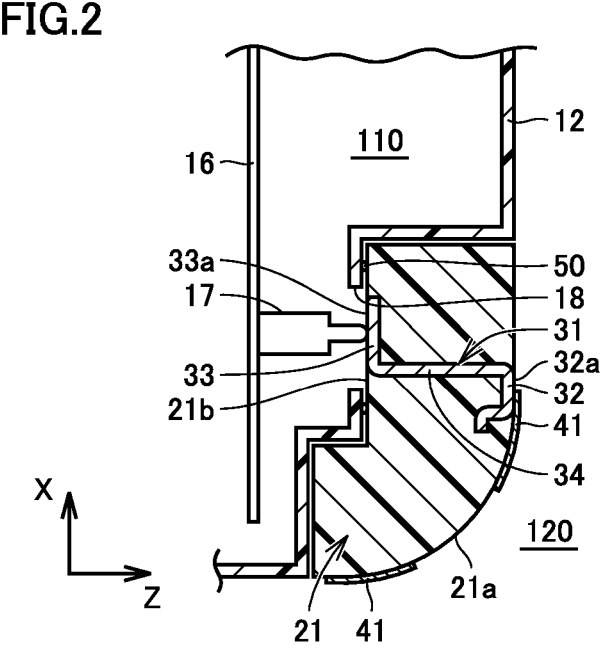
FIG. 2 is a cross-sectional view showing the mobile phone along line II-II shown in FIG. 1.
Figure 3:
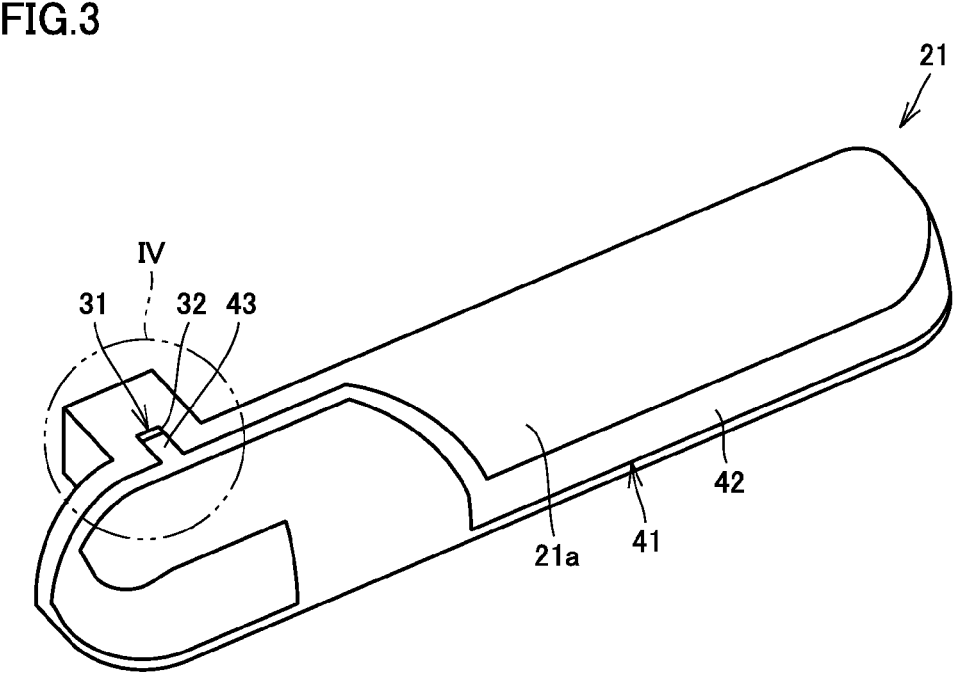
FIG. 3 is a perspective view showing an antenna housing of the mobile phone shown in FIG. 1.

FIG. 1 is a front view showing the appearance of a mobile phone according to a first embodiment of this invention. FIG. 2 is a cross-sectional view showing the mobile phone along line II-II shown in FIG. 1. FIG. 3 is a perspective view showing an antenna housing of the mobile phone shown in FIG. 1.

With reference to FIGS. 1 to 3, a mobile phone 10 in this embodiment is a multifunctional type mobile phone having, in addition to a telephone function and a communication function, various functions such as an Internet function and the like. Mobile phone 10 includes, as its principal elements, a main body case 12, an antenna housing 21, a substrate 16, an insert metal plate 31, an antenna element 41, and packing 50.

Main body case 12 forms the appearance of mobile phone 10. Main body case 12 has a flat plate shape in which directions along an X axis, a Y axis, and a Z axis, respectively, shown in the figures are defined as a longitudinal direction, a lateral (width) direction, and a thickness direction. Substrate 16 is housed within main body case 12. Main body case 12 houses, in addition to substrate 16, a plurality of electronic components for mobile phone 10 to perform its functions. On an outer surface of main body case 12, a display on which various screens are displayed is provided, although not shown.

A mounted spring 17 is mounted on substrate 16. Mounted spring 17 electrically connects between substrate 16 and insert metal plate 31, which is described below. An opening 18 is formed in main body case 12. Opening 18 is formed to provide communication between space within main body case 12 that houses substrate 16 and space outside main body case 12. Opening 18 is provided in a position opposed to mounted spring 17. In this embodiment, opening 18 is provided such that its open surface faces the Z axis direction (the thickness direction of main body case 12).

Antenna housing 21, together with main body case 12, forms the appearance of mobile phone 10. Antenna housing 21 is formed of a resin. Antenna housing 21 is smaller than main body case 12.

Antenna housing 21 is combined with an end of main body case 12 in the X axis direction (longitudinal direction). Antenna housing 21 is combined with the bottom of main body case 12. Antenna housing 21 is combined with main body case 12 so as to block opening 18. Antenna housing 21 as a whole has a bar shape extending in the Y axis direction (the width direction of main body case 12).

Antenna housing 21 has an outer surface 21a and a mating surface 21b. Outer surface 21a is formed to include a curved surface. Mating surface 21b is provided to face main body case 12. In this embodiment, mating surface 21b faces main body case 12 around opening 18. Mating surface 21b extends on an X axis-Y axis plane.

Antenna element 41 has an antenna function for communication. Antenna element 41 has a thin film shape, and is provided on outer surface 21a of antenna housing 21. Antenna element 41 is provided along the curved shape of outer surface 21a of antenna housing 21. Antenna element 41 as a whole extends in the Y axis direction (the width direction of main body case 12) as it changes its direction of travel more than once. Antenna element 41 has a thickness not less than 10 μm and not more than 100 μm, for example.

In this embodiment, antenna element 41 is formed by printing a conductive metal pattern on outer surface 21a of antenna housing 21. Antenna element 41, however, is not limited to such a structure, and may also be formed with metal plating, for example. Antenna element 41 may be obtained by forming an element into a prescribed antenna shape directly onto outer surface 21a of antenna housing 21. Alternatively, antenna element 41 may be obtained by joining onto outer surface 21a of antenna housing 21 an element formed into a prescribed antenna shape.

Figure 4:
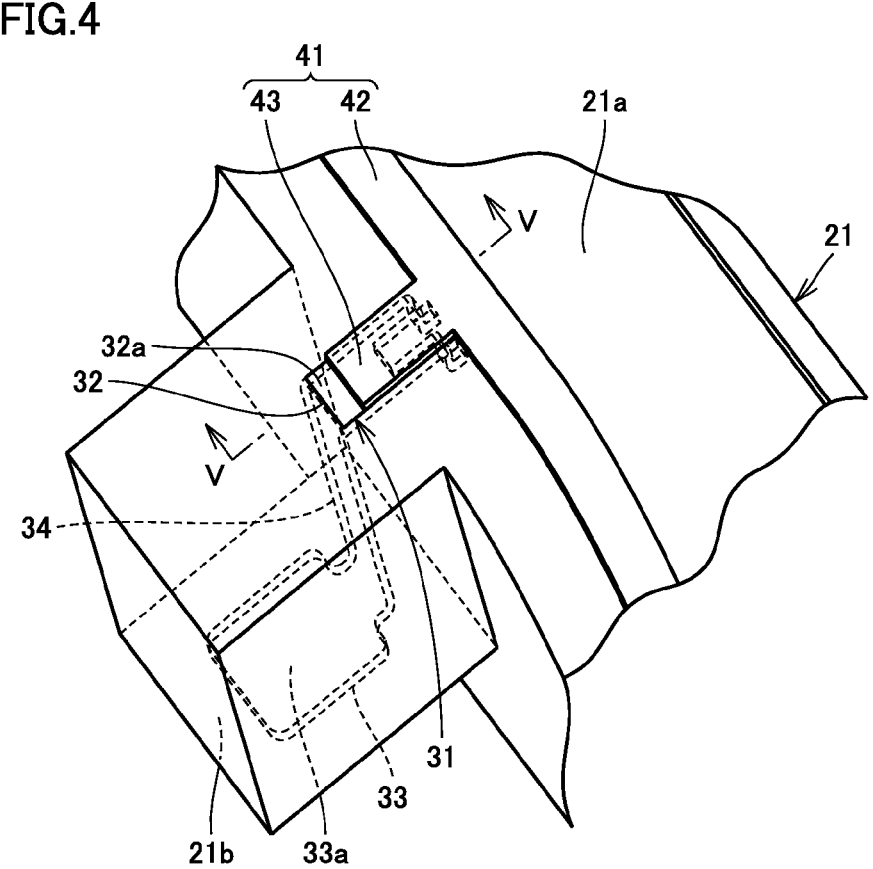
FIG. 4 is a perspective view showing the antenna housing within the region surrounded by chain double-dashed line IV shown in FIG. 3.
Figure 5:
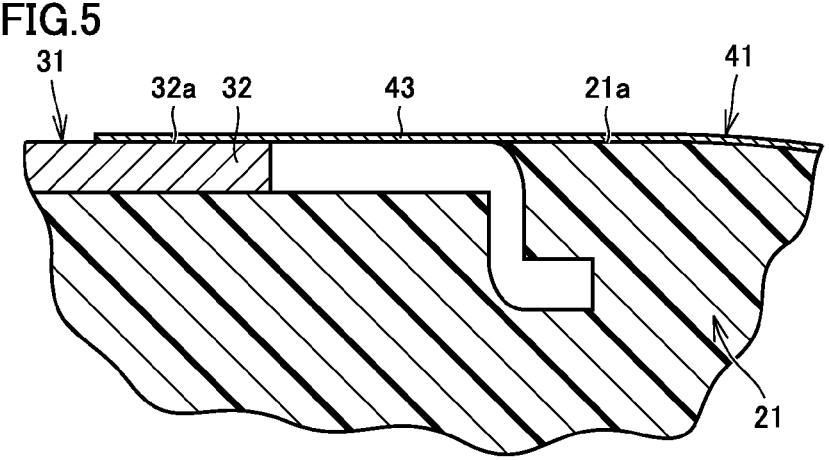
FIG. 5 is a cross-sectional view showing the antenna housing along line V-V shown in FIG. 4.

FIG. 4 is a perspective view showing the antenna housing within the region surrounded by chain double-dashed line IV shown in FIG. 3. FIG. 5 is a cross-sectional view showing the antenna housing along line V-V shown in FIG. 4.

With reference to FIGS. 2 to 5, insert metal plate 31 is formed of a conductive member. Insert metal plate 31 is provided as a conductive member for electrically connecting between substrate 16 and antenna element 41. Insert metal plate 31 is buried in antenna housing 21. Insert metal plate 31 is insert molded into antenna housing 21 made of a resin.

With respect to the shape of insert metal plate 31, specifically, insert metal plate 31 has, as its constitutional parts, a connecting portion 32, a power feed portion 33, and an intermediate portion 34.

Connecting portion 32 is provided to become exposed to the outside space from outer surface 21a of antenna housing 21. Power feed portion 33 is provided to become exposed within main body case 12. Power feed portion 33 is exposed within main body case 12 through opening 18. Intermediate portion 34 is provided to connect between connecting portion 32 and power feed portion 33. Insert metal plate 31 is covered with the resin that forms antenna housing 21, between connecting portion 32 and power feed portion 33 (that is, on intermediate portion 34).

In this embodiment, insert metal plate 31 has a shape bent at a right angle between connecting portion 32 and intermediate portion 34 and between intermediate portion 34 and power feed portion 33. Insert metal plate 31 as a whole has a Z-shaped cross section. The shape of insert metal plate 31 may be changed as appropriate, in correspondence with the positional relation between substrate 16 (mounted spring 17) and antenna element 41.

Connecting portion 32 has a surface 32a. Surface 32a is exposed to the outside space from outer surface 21a of antenna housing 21. Surface 32a extends from outer surface 21a of antenna housing 21 in a continuously connected manner. That is, surface 32a of connecting portion 32 is provided to become even with outer surface 21a of antenna housing 21. Surface 32a of connecting portion 32 is flush with outer surface 21a of antenna housing 21.

Power feed portion 33 has a surface 33a. In this embodiment, surface 33a is exposed within main body case 12 from mating surface 21b of antenna housing 21.

Antenna element 41 is provided on outer surface 21a of antenna housing 21 to be in contact with connecting portion 32. Antenna element 41 is in contact with surface 32a of connecting portion 32. Mounted spring 17 is provided to be in contact with power feed portion 33. Mounted spring 17 is biased toward power feed portion 33 due to its elastic force. With this structure, substrate 16 and antenna element 41 are electrically connected with each other with insert metal plate 31 and mounted spring 17 interposed therebetween, inside and outside main body case 12.

Antenna element 41 has, as its constitutional parts, an antenna element main body 42 and an extension 43.

Antenna element main body 42 extends on outer surface 21a of antenna housing 21. Antenna element main body 42 as a whole extends in the Y axis direction (the width direction of main body case 12) as it changes its direction of travel more than once. Antenna element main body 42 extends in the form of a string on outer surface 21a of antenna housing 21.

Extension 43 is provided as a branch from the path of antenna element main body 42. Extension 43 extends toward connecting portion 32 from the path of antenna element main body 42 to be brought into contact with connecting portion 32 of insert metal plate 31 at its end.

The provision of extension 43 in antenna element 41 allows the shape of antenna element main body 42 to be determined without taking into account the connected position with insert metal plate 31. This allows a connection between antenna element 41 and insert metal plate 31 to be established by means of extension 43, while achieving an efficient antenna shape in antenna element main body 42.

Packing 50 is provided as a seal member that establishes waterproofness between main body case 12 and antenna housing 21. Packing 50 is held between main body case 12 and antenna housing 21. Packing 50 is provided in contact with mating surface 21b. Packing 50 is provided to surround the circumference of opening 18.

Packing 50 serves to define a boundary between a waterproof region 110, which is space in which substrate 16 and various electronic components are housed, and a non-waterproof region 120, which is space outside waterproof region 110 and in which antenna element 41 is disposed. Packing 50 is provided so as not to overlap with connecting portion 32 of insert metal plate 31 and power feed portion 33. Connecting portion 32 of insert metal plate 31, serving as a contact point with antenna element 41, is disposed in non-waterproof region 120. Power feed portion 33 of insert metal plate 31, serving as a contact point with substrate 16, with mounted spring 17 interposed therebetween, is disposed in waterproof region 110.

In this structure, since insert metal plate 31 for electrically connecting between substrate 16 and antenna element 41 is insert molded into antenna housing 21, the waterproofness of mobile phone 10 can be prevented from being impaired due to the connection structure between substrate 16 and antenna element 41. In particular, in this embodiment, packing 50 for establishing the waterproofness between main body case 12 and antenna housing 21 is provided so as not to overlap with power feed portion 33 and connecting portion 32 of insert metal plate 31 exposed from antenna housing 21. In this way, since unevenness due to insert metal plate 31 is not formed on the region where packing 50 is provided, the waterproofness of mobile phone 10 can be sufficiently improved.

Additionally, during the manufacturing process of mobile phone 10, antenna housing 21 into which insert metal plate 31 has been insert molded in advance is assembled onto main body case 12, thus completing the electrical connection between substrate 16 and antenna element 41. This allows the manufacturing process of mobile phone 10 to be simplified.

Figure 6:
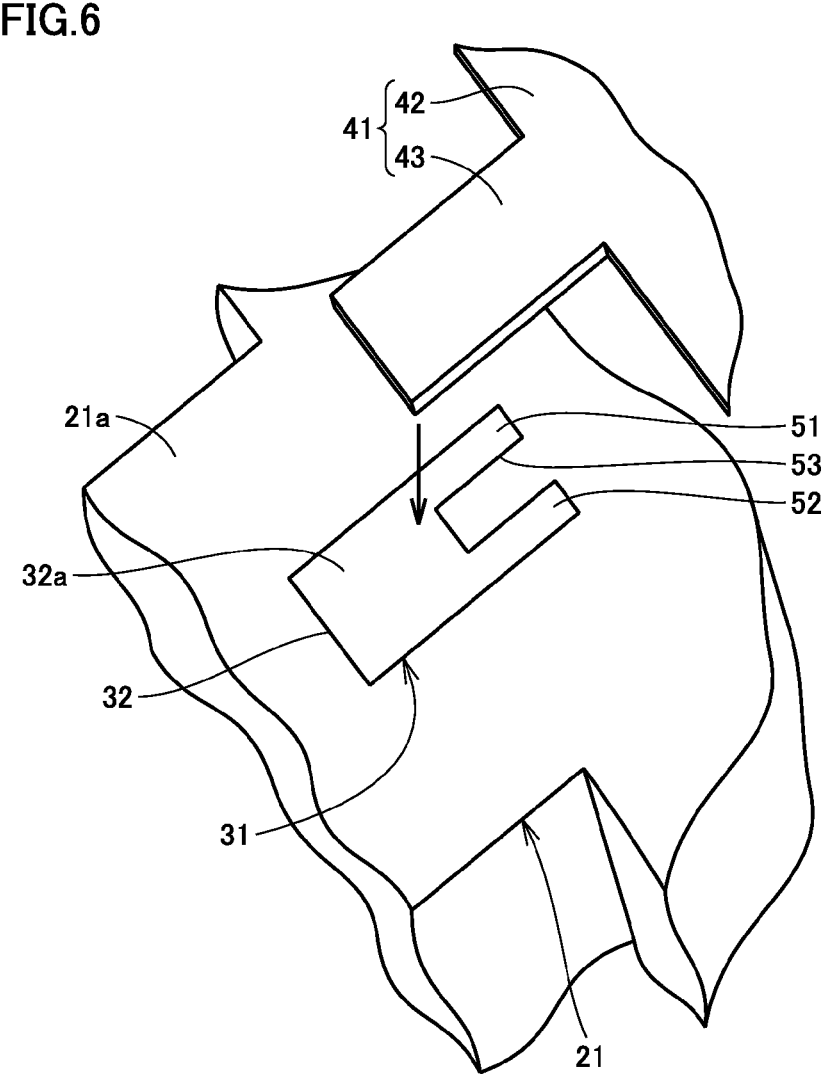
FIG. 6 is an exploded view of the antenna housing and the antenna element shown in FIG. 4.
Figure 7:
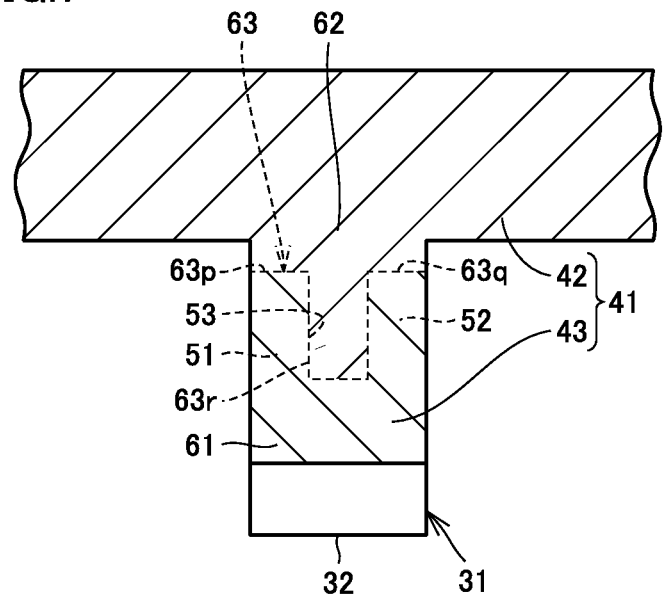
FIG. 7 is a plan view showing the connected part between the insert metal plate and the antenna element shown in FIG. 4.

FIG. 6 is an exploded view of the antenna housing and the antenna element shown in FIG. 4. FIG. 7 is a plan view showing the connected part between the insert metal plate and the antenna element shown in FIG. 4.

With reference to FIGS. 4 to 7, in mobile phone 10 according to this embodiment, a boundary 63 between a region 61 where antenna element 41 is in contact with connecting portion 32 and a region 62 where antenna element 41 is in contact with antenna housing 21 is nonlinear. It is noted that in FIG. 7, as well as FIGS. 8 to 11 described below, region 61 and region 62 are indicated by different hatch lines.

When outer surface 21a of antenna housing 21 on which connecting portion 32 is exposed is seen two-dimensionally, connecting portion 32 is formed with an uneven shape including protrusions 51 and 52, and a depression 53. Protrusions 51 and 52 each form a protruding shape toward region 62. Protrusions 51 and 52 protrude in a direction opposite to a direction in which extension 43 from antenna element main body 42 extends. Protrusions 51 and 52 protrude in a direction closer to antenna element main body 42 from connecting portion 32. Depression 53 forms a depressed shape, and is formed between protrusions 51 and 52. The depressed shape of depression 53 is formed by a valley between protrusions 51 and 52. Depression 53 has a rectangular shape between protrusions 51 and 52.

It is noted that the number of protrusions 51, 52 and the number of depression(s) 53 formed on connecting portion 32 are not limited to those described above, and two or more depressions may be formed on connecting portion 32.

Connecting portion 32 having the uneven shape makes boundary 63 between regions 61 and 62 nonlinear. In this embodiment, boundary 63 is defined by a plurality of straight lines extending in different directions being connected to one another. Boundary 63 is defined by a plurality of straight lines extending in a direction in which antenna element main body 42 stretches and a plurality of straight lines extending in a direction in which extension 43 from antenna element main body 42 extends, with these straight lines being connected to one another.

Boundary 63 includes a straight portion 63p, a straight portion 63q, and a combining portion 63r. Straight portion 63p extends in a straight line from one outer edge of antenna element 41 (extension 43). Straight portion 63q extends in a straight line from the other outer edge of antenna element 41 (extension 43). Combining portion 63r lies across straight portions 63p and 63q to connect them. Combining portion 63r lies at an angle with straight portions 63p and 63q. With combining portion 63r, straight portions 63p and 63q are discontinuous on the straight line along which straight portions 63p and 63q extend.

A situation is envisaged in which mobile phone 10 is subjected to an excessive external shock upon being dropped, for example. In this case, the metal forming insert metal plate 31 and the resin forming antenna housing 21 have different amounts of distortion induced upon being subjected to the shock. The shock-induced distortion of antenna element 41 joined to insert metal plate 31 conforms to the metal, and the shock-induced distortion of antenna element 41 joined to antenna housing 21 conforms to the resin, and hence, antenna element 41 is likely to form a crack (tear) at boundary 63 between region 61 where antenna element 41 is in contact with connecting portion 32 and region 62 where antenna element 41 is in contact with antenna housing 21.

In this embodiment, therefore, with attention focused on the tendency of a crack to spread in a straight line, boundary 63 between regions 61 and 62 is made nonlinear. With this structure, even if a crack is formed at boundary 63 when mobile phone 10 is dropped, for example, the crack will be stopped at straight portions 63p and 63q. This allows antenna element 41 to be prevented from being separated at combining portion 63r.

With respect to the structure of mobile phone 10 according to the first embodiment of this invention described above, in summary, mobile phone 10 as a mobile device according to this embodiment includes antenna housing 21 as a housing made of a resin, insert metal plate 31 as a conductive member made of a metal, which is buried in antenna housing 21 and has connecting portion 32 exposed from outer surface 21a of antenna housing 21, and antenna element 41 provided on outer surface 21a of antenna housing 21 and brought into contact with connecting portion 32. Boundary 63 between region 61 as a first region where antenna element 41 is in contact with connecting portion 32 and region 62 as a second region where antenna element 41 is in contact with antenna housing 21 is nonlinear.

In mobile phone 10 according to the first embodiment of this invention having the above-described structure, since boundary 63 between region 61 where antenna element 41 is in contact with connecting portion 32 and region 62 where antenna element 41 is in contact with antenna housing 21 is nonlinear, antenna element 41 can be prevented from being completely separated at boundary 63 when mobile phone 10 is subjected to an external shock. This allows deterioration of the antenna performance of mobile phone 10 to be minimized While the case in which the invention is applied to a mobile phone has been described in this embodiment, the invention is not limited thereto, and is applied to any of various types of mobile devices having an antenna outside the housing.

Second Embodiment

In this embodiment, various modifications of the uneven shape of connecting portion 32 of insert metal plate 31 will be described.

Figure 8:
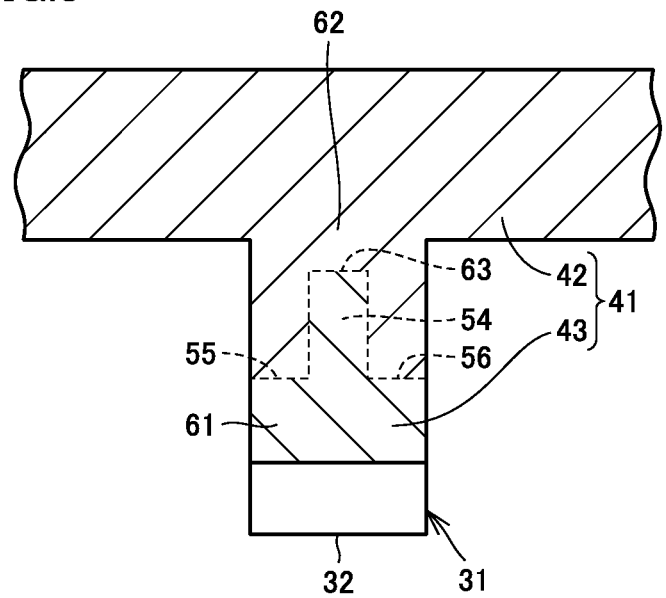
FIG. 8 is a plan view showing a first modification of the uneven shape of the connecting portion of the insert metal plate shown in FIG. 7.

FIG. 8 is a plan view showing a first modification of the uneven shape of the connecting portion of the insert metal plate shown in FIG. 7. With reference to FIG. 8, in this modification, when outer surface 21a of antenna housing 21 on which connecting portion 32 is exposed is seen two-dimensionally, connecting portion 32 is formed with an uneven shape including a protrusion 54, and a stepped portion 55 and a stepped portion 56.

Protrusion 54 forms a protruding shape toward region 62. Protrusion 54 protrudes in a direction opposite to the direction in which extension 43 from antenna element main body 42 extends. Protrusion 54 protrudes in a direction closer to antenna element main body 42 from connecting portion 32. Stepped portions 55 and 56 are each formed on opposite sides of protrusion 54. Stepped portions 55 and 56 are provided to have a step with protrusion 54 in a direction in which protrusion 54 protrudes. The protruding shape of protrusion 54 is formed by a ridge between stepped portions 55 and 56. Protrusion 54 has a rectangular shape between stepped portions 55 and 56.

Figure 9:
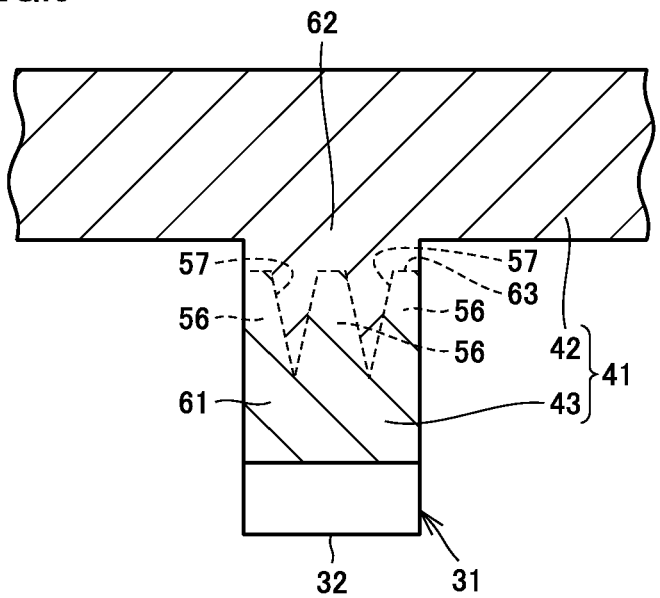
FIG. 9 is a plan view showing a second modification of the uneven shape of the connecting portion of the insert metal plate shown in FIG. 7.
Figure 10:
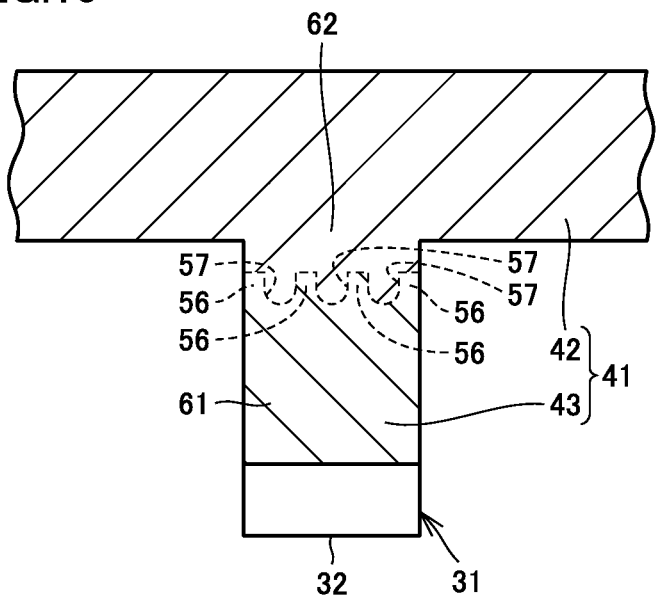
FIG. 10 is a plan view showing a third modification of the uneven shape of the connecting portion of the insert metal plate shown in FIG. 7.
Figure 11:
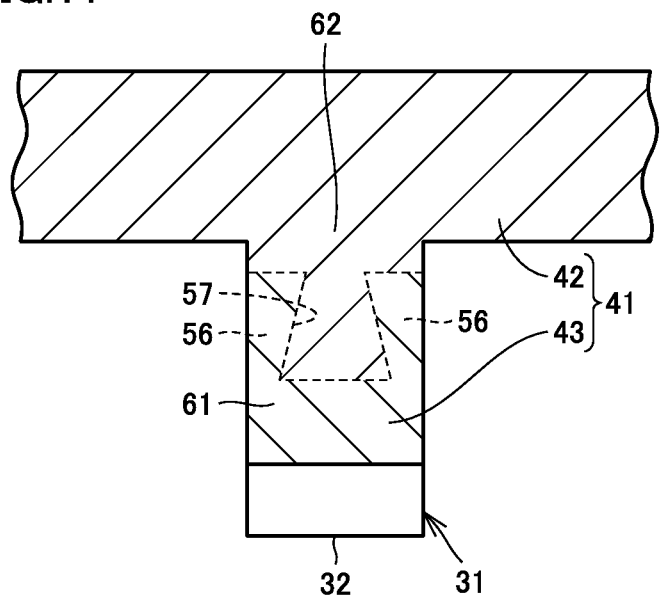
FIG. 11 is a plan view showing a fourth modification of the uneven shape of the connecting portion of the insert metal plate shown in FIG. 7.

FIG. 9 is a plan view showing a second modification of the uneven shape of the connecting portion of the insert metal plate shown in FIG. 7. FIG. 10 is a plan view showing a third modification of the uneven shape of the connecting portion of the insert metal plate shown in FIG. 7. FIG. 11 is a plan view showing a fourth modification of the uneven shape of the connecting portion of the insert metal plate shown in FIG. 7.

With reference to FIGS. 9 to 11, in each of these modifications, when outer surface 21a of antenna housing 21 on which connecting portion 32 is exposed is seen two-dimensionally, connecting portion 32 is formed with an uneven shape including a plurality of protrusions 56 and a depression 57. In the modification shown in FIG. 9, depression 57 has a triangular shape between adjacent protrusions 56. In the modification shown in FIG. 10, depression 57 has a semicircular shape between adjacent protrusions 56. In the modification shown in FIG. 11, depression 57 has a trapezoidal shape between adjacent protrusions 56.

It is noted that the structures described in the foregoing first to fourth embodiments may be combined as appropriate to form connecting portion 32 into a new uneven shape. For example, protrusion 54 shown in FIG. 8 may be provided to have the depressed shape of depression 57 shown in any of FIGS. 9 to 11.

The mobile phone according to the second embodiment of this invention having the above-described structure can provide an effect similar to that described in the first embodiment.

Third Embodiment

Figure 12:
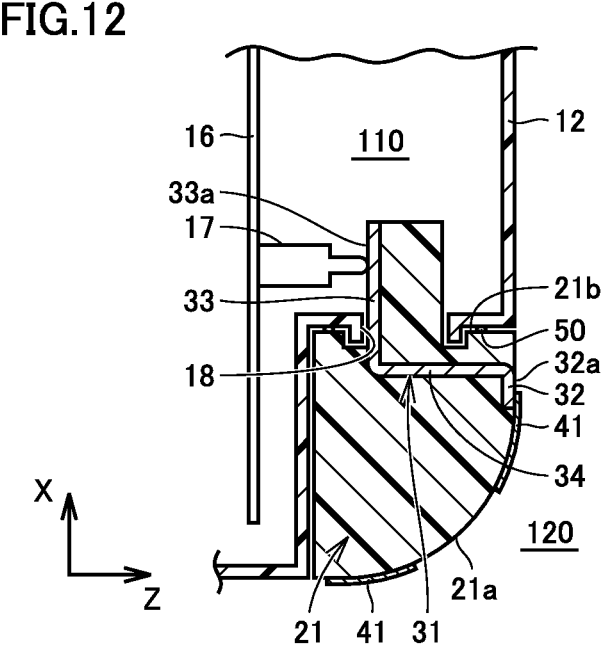
FIG. 12 is a cross-sectional view showing a mobile phone according to a third embodiment of this invention.

FIG. 12 is a cross-sectional view showing a mobile phone according to a third embodiment of this invention. FIG. 12 corresponds to FIG. 2 in the first embodiment. The mobile phone according to this embodiment is basically similar in structure to mobile phone 10 according to the first embodiment. The description of the same parts of the structure will not be repeated below.

With reference to FIG. 12, in this embodiment, opening 18 formed in main body case 12 is provided such that its open surface faces the X axis direction (the longitudinal direction of main body case 12). Antenna housing 21 is combined with the bottom of main body case 12 such that it is partially inserted into main body case 12 through opening 18 in the X axis direction.

Power feed portion 33 of insert metal plate 31 is exposed within main body case 12 in a position facing substrate 16. Mating surface 21b of antenna housing 21 is provided to face main body case 12. Mating surface 21b faces main body case 12 around opening 18. Mating surface 21b extends on a Y axis-Z axis plane. Packing 50 is provided in contact with mating surface 21b. Packing 50 is provided to surround the circumference of opening 18.

Figure 13:
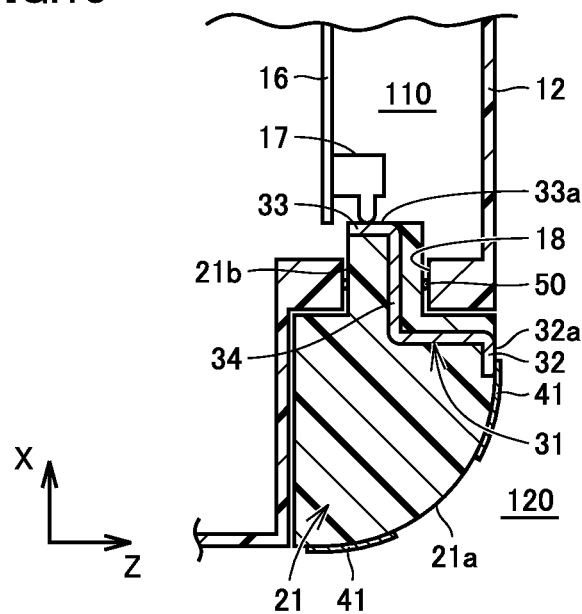
FIG. 13 is a cross-sectional view showing a modification of the mobile phone shown in FIG. 12.

FIG. 13 is a cross-sectional view showing a modification of the mobile phone shown in FIG. 12. With reference to FIG. 12, in this modification, power feed portion 33 of insert metal plate 31 is exposed within main body case 12 in a position facing mounted spring 17 in the X axis direction. Mating surface 21b of antenna housing 21 is provided to face main body case 12. Mating surface 21b faces an inner circumferential surface of main body case 12 that defines opening 19. Packing 50 is provided in contact with mating surface 21b. Packing 50 is provided along the inner circumferential surface of main body case 12 that defines opening 18.

The mobile phone according to the third embodiment of this invention having the above-described structure can provide an effect similar to that described in the first embodiment.

It is noted that the structures of the mobile phones described in the first to third embodiments may be combined as appropriate to constitute a new mobile phone.

Preferred embodiments of the invention will be described hereinafter.

Preferably, the connecting portion, when the outer surface of the housing is seen two-dimensionally, has an uneven shape including a first protrusion and a second protrusion forming a protruding shape toward the second region, and a depression formed between the first protrusion and the second protrusion. Preferably, the connecting portion, when the outer surface of the housing is seen two-dimensionally, has an uneven shape including a protrusion forming a protruding shape toward the second region, and a first stepped portion and a second stepped portion formed on opposite sides of the protrusion.

In the mobile device having this structure, the uneven shape of the connecting portion allows the boundary between the first region where the antenna element is in contact with the connecting portion and the second region where the antenna element is in contact with the outer surface of the housing to be nonlinear.

Preferably, the mobile device further includes a main body case that is combined with the housing and houses a substrate, and a seal member that is provided between the main body case and the housing, and defines a boundary between a waterproof region in which the substrate is disposed and a non-waterproof region in which the antenna element is disposed. The conductive member is exposed within the main body case, and further has a power feed portion electrically connected to the substrate. The seal member is provided so as not to overlap with the connecting portion and the power feed portion.

In the mobile device having this structure, since unevenness due to the conductive member is not formed on the region where the seal member is provided, the waterproofness of the mobile device can be sufficiently improved.

Preferably, the antenna element has an antenna element main body extending on the outer surface of the housing, and an extension extending toward the connecting portion from a path of the antenna element main body to be brought into contact with the connecting portion at an end thereof.

In the mobile device having this structure, a connection between the antenna element and the conductive member can be established by means of the extension, while achieving an efficient antenna shape in the antenna element main body.

It should be understood that the embodiments disclosed herein are illustrative and non-restrictive in every respect. It is intended that the scope of the present invention is defined by the terms of the claims rather than by the foregoing description, and includes all modifications within the scope and meaning equivalent to the claims.

INDUSTRIAL APPLICABILITY

This invention is applied to mobile devices such as mobile phones.

REFERENCE SIGNS LIST

10: mobile phone; 12: main body case; 16: substrate; 17: mounted spring; 18: opening; 21: antenna housing; 21*a*: outer surface; 21*b*: mating surface; 31: insert metal plate; 32 connecting portion; 32*a*, 33*a*: surface; 33: power feed portion; 34: intermediate portion; 41: antenna element; 42: antenna element main body; 43: extension; 50: packing; 51, 52, 54, 56: protrusion; 53, 57: depression; 55, 56: stepped portion; 61, 62: region; 63: boundary; 63*p*, 63*q*: straight portion; 63*r*: combining portion; 110: waterproof region; 120: non-waterproof region.

The invention claimed is:

1. A mobile device comprising:
   a housing made of a resin including an outer surface, the outer surface facing an external space outside of said housing;
   a conductive member made of a metal in said housing and including a connecting portion exposed through the outer surface of said housing to the external space; and
   a thin film antenna along the outer surface of said housing and able to contact with said connecting portion in the external space,
   a boundary between a first region where said thin film antenna is in contact with said connecting portion in the external space and a nonlinear second region where said thin film antenna is in contact with said housing in the external space.

2. The mobile device according to claim 1, wherein said connecting portion, when the outer surface of said housing is viewed two-dimensionally, has an uneven shape including a first protrusion and a second protrusion each defining a protruding shape toward said nonlinear second region, and a depression between said first protrusion and said second protrusion.

3. The mobile device according to claim 1, wherein said connecting portion, when the outer surface of said housing is viewed two-dimensionally, has an uneven shape including a protrusion defining a protruding shape toward said nonlinear second region, and a first stepped portion and a second stepped portion on opposite sides of said protrusion and including a step with said protrusion.

4. The mobile device according to claim 1, further comprising:
   a main body case combined with said housing and including a substrate; and
   a seal member between said main body case and said housing, said seal member defining a boundary between a waterproof region in which said substrate is disposed and a non-waterproof region in which said thin film antenna is disposed, wherein
   said conductive member is exposed within said main body case, and further includes a power feed portion electrically connected to said substrate, and
   said seal member does not overlap with said connecting portion and said power feed portion.

5. The mobile device according to claim 1, wherein said thin film antenna includes a main body extending on the outer surface of said housing, and an extension extending toward said connecting portion from a path of said thin film antenna main body and able to contact with said connecting portion at an end thereof.

* * * * *